March 11, 1924.

I. W. HILLS

ANIMAL TRAP

Filed April 6, 1923       5 Sheets-Sheet 1

Inventor

I. W. Hills.

By Lacy & Lacy, Attorneys

March 11, 1924.
I. W. HILLS
ANIMAL TRAP
Filed April 6, 1923

Inventor
I. W. Hills.
By
Lacy & Lacey, Attorneys

March 11, 1924.

I. W. HILLS

ANIMAL TRAP

Filed April 6, 1923   5 Sheets-Sheet 3

Inventor
I. W. Hills.
By Larry Racey, Attorneys

March 11, 1924.

I. W. HILLS

ANIMAL TRAP

Filed April 6, 1923   5 Sheets-Sheet 4

Inventor.
I. W. Hills.

By Lacy & Lacy, Attorneys

March 11, 1924.

I. W. HILLS

ANIMAL TRAP

Filed April 6, 1923   5 Sheets-Sheet 5

1,486,663

Inventor
I. W. Hills.
By
Lacy & Lacy, Attorneys

Patented Mar. 11, 1924.

1,486,663

UNITED STATES PATENT OFFICE.

IRAD W. HILLS, OF STANLEY, WISCONSIN.

ANIMAL TRAP.

Application filed April 6, 1923. Serial No. 630,329.

*To all whom it may concern:*

Be it known that I, IRAD W. HILLS, citizen of the United States, residing at Stanley, in the county of Chippewa and State of Wisconsin, have invented certain new and useful Improvements in Animal Traps, of which the following is a specification.

This invention relates to an improved trap for catching rodents or other small animals and seeks, among other objects, to provide a trap which will be self-setting and thus always set.

The invention has as a further object to provide a trap having a main entrance chamber and wherein a mirror will be provided in said chamber opposite the main entrance of the trap so that a rodent about to enter the trap will be enticed into the chamber by the image of the animal visible in the mirror.

A further object is to provide a trap wherein the rodent upon entering the entrance chamber will, by its own weight, operate a door cutting off retreat of the animal.

The invention seeks as another object to provide a trap wherein when the door is shifted, a picture of an animal the natural enemy of the rodent, will coincidently be automatically shifted into the view of the rodent opposite the mirror so that the rodent may not only see the picture itself but also the image of the picture in the mirror whereby the rodent will be frightened from the entrance chamber of the trap into the trap drum chamber to pass through said drum and finally emerge into the cage chamber of the trap.

A further object of the invention in this connection is to provide a trap embodying a trap drum having the floor thereof so arranged that the drum will be caused to quickly trip under the weight of an animal upon the floor, for cutting off retreat of the animal.

And the invention has as a still further object to provide a trap which will be characterized by efficiency and dependability of operation.

Other and incidental objects will appear hereinafter.

Figure 3:
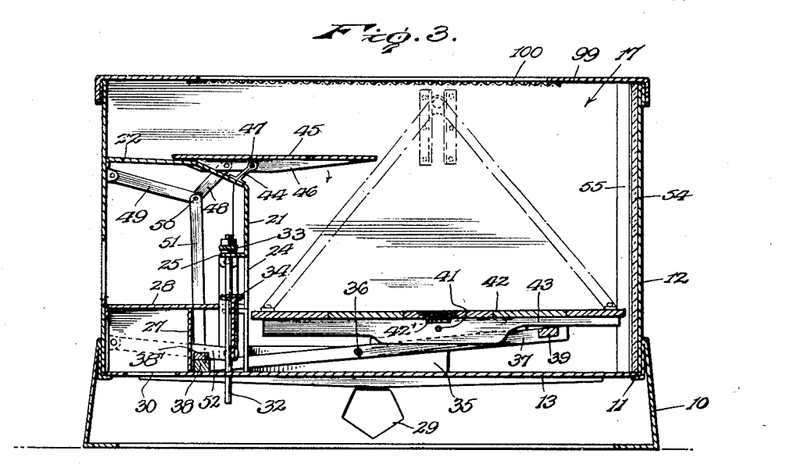
Figure 3 is a transverse sectional view on the line 3—3 of Figure 2, looking in the direction of the arrows.
Figure 4:
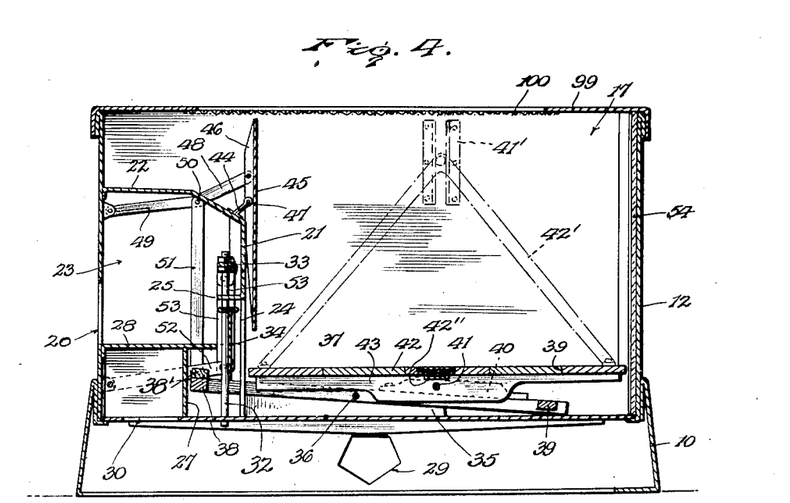
Figure 4 is a view similar to Figure 3, showing the entrance door closed.
Figure 5:
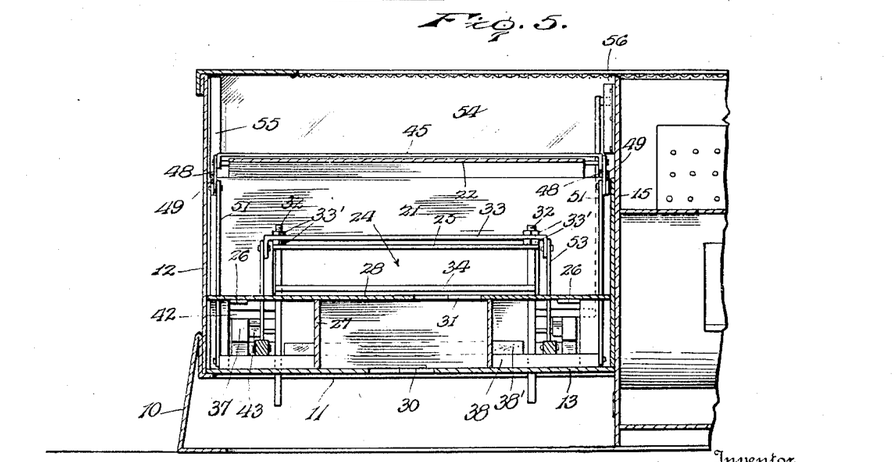
Figure 5 is a fragmentary vertical sectional view on the line 5—5 of Figure 2, looking in the direction of the arrows.

In carrying the invention into effect, I employ an oblong base frame 10 which is preferably formed of suitable sheet metal and is bent, in the manner best shown in Figures 3 and 4 of the drawings, to define an internal flange 11. Snugly fitting within the frame is the trap body 12 resting upon said flange. The trap body is also preferably formed of suitable sheet metal and removably fitting in the end portions of the body to rest upon the flange 11 are bottom plates 13 and 14 respectively. Slidably fitting between the side walls of the body are partitions 15 and 16 supported by the flange 11 between the plates 13 and 14, the partitions dividing the body into three chambers which, for convenience, are designated an entrance chamber 17 at one end of the body, a trap drum chamber 18 centrally of the body, and a cage chamber 19 at the other end of the body.

Figure 6:
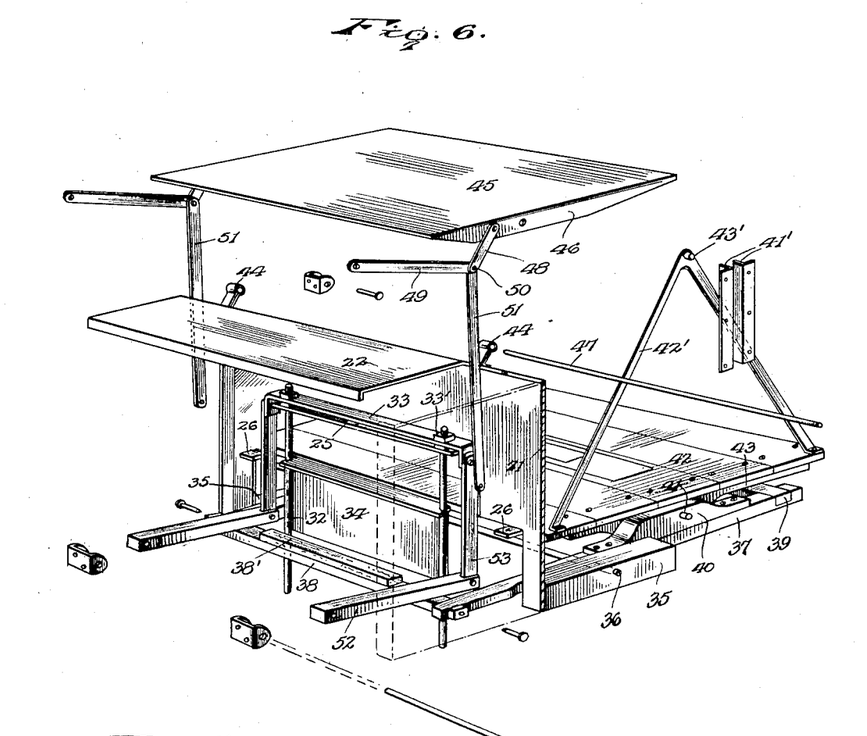
Figure 6 is an enlarged perspective view of the entrance door and associated parts.

Formed in the forward side wall of the body at one end of the chamber 17 is an entrance opening 20 and removably fitting between the partition 15 and the adjacent end wall of the body is a plate 21 resting upon the bottom plate 13 and provided with a top wall 22 to form a vestibule 23. Opposite the entrance 20, the plate 21 is cut away to form a door opening 24 at the upper end of which is a forwardly overhanging flange 25 while at the ends of said door opening are flanges 26, the plate being, as shown in Figure 6, notched back at the ends of the door opening. Secured to the bottom plate 13 is a spacing strip 27 and resting upon said strip is a plate 28 forming the floor of the vestibule 23, the plate being sustained at its inner longitudinal margin by the flanges 26. As brought out in Figures 3 and 4, the base 10 of the trap is provided at its adjacent end with an entrance opening 29 while the bottom plate 13 is provided with a similar opening 30 surrounded by the spacing strip 27 and formed in the floor plate 28 of the vestibule 23 is a like opening 31, the strip 27 providing a passage between the openings 30 and 31. Thus, an animal entering through the opening 29 may find its way into the vestibule 23.

Figure 1:
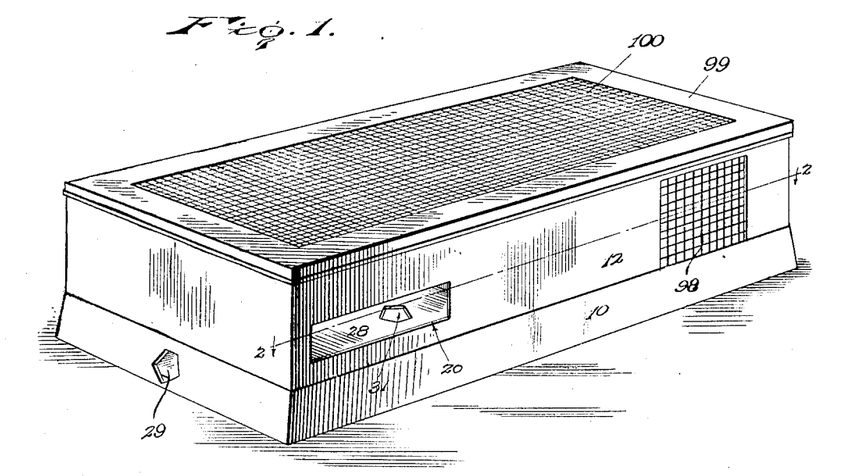
Figure 1 is a perspective view of my improved trap.
Figure 2:
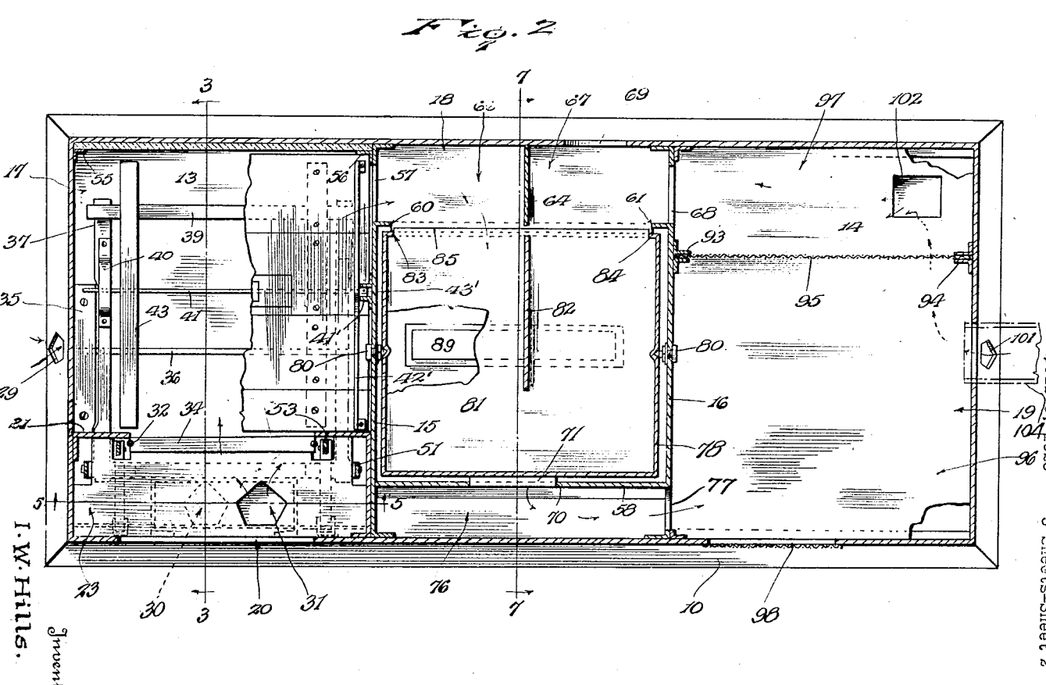
Figure 2 is a horizontal sectional view on the line 2—2 of Figure 1, looking in the direction of the arrows.

Slidable through the flange 25 of the plate 21 near the ends of said flange and through the bottom plate 13 are vertical guide rods 32 coupled at their upper ends by a cross strip 33 adjustably connected with the rods by nuts 33′ clamping the strip therebetween and soldered or otherwise appropriately connected to the rods is a door 34 supported by the rods to shift vertically in front of the door opening 24. Bolted or otherwise secured to the bottom plate 13 are bearings blocks 35 and extending between said blocks is a cross rod 36. Mounted to rock upon said rod is a rectangular lever frame comprising side bars 37 connected by end bars 38 and 39. The side bars 37 freely receive the rod therethrough and mounted upon said bars near the inner ends thereof are blocks 40. Extending between said blocks is a cross rod 41 and pivoted upon said rod is a door actuating platform 42 having spaced parallel sills 43 accommodating the rod therethrough. Mounted upon the partition 15 are parallel vertical flanges 41′ and secured at its ends to the platform is an inverted V-shaped guide member 42′ provided at its apex with a stud 43′ slidably fitting between said flanges holding the platform in a horizontal position. Mounted upon the top wall 22 of the plate 21 are spaced bearing sleeves 44 and pivotally supported by said sleeves is a picture carrying member or plate 45 provided at its ends with flanges 46 through which is engaged a pivot rod 47 extending through the sleeves pivotally connecting said member therewith. Pivotally connected to the flanges 46 are links 48 and extending between said links and the front side wall of the trap body are links 49 pivotally connected with the links 48 by pivot pins 50. Pivotally connected at their lower ends with the cross bar 38 of the lever frame of the platform 42 are rods 51, the upper ends of which are connected with the links 48 and 49 by the pivot pins 50. Pivotally connected with the front side wall of the trap body beneath the floor 28 of the vestibule are links 52 extending over said cross bar 38 and connecting the inner ends of said links with the ends of the cross strip 33 are rods 53. Thus, the weight of the door 34 will be communicated to the links 52, which will bear downwardly upon the cross bar 38 for rocking the outer end of the lever frame or platform downwardly and elevating the platform 42 so that, as shown in Figure 3, the door will normally stand open while the picture carrying member 45 will normally be swung upwardly to horizontal position. Preferably, the end bar 38 is equipped with a counterweight 38′ while the platform 42 carries a pocket 42″ into which shot may be introduced for delicately balancing the lever frame. An animal may thus readily enter the chamber 17 at the entrance 20 to pass through the vestibule 23 and through the door opening 24 into said chamber. Resting against the rear side wall of the trap body at the rear of the chamber is a mirror 54 removably fitting behind a flange 55 upon the adjacent end wall of the trap body and behind a similar flange 56 upon the partition 15. Accordingly, as will be seen upon an inspection of Figure 3, an animal about to enter the trap at the entrance 20 may see a reflection of itself in the mirror 54. The chamber 17 will thus appear, to the animal, to be already occupied by another animal so that the animal will be enticed into the chamber onto the platform 42 which, under the weight of the animal, will move downwardly causing the lever frame carrying the platform to be suddenly rocked downwardly at its inner end. As the lever frame is thus rocked, the links 52 will be lifted upwardly at their free ends by the cross bar 38 of said frame for closing the door 34, cutting off retreat of the animal, while the rods 51 will also be shifted upwardly for rocking the picture carrying member 45 downwardly to vertical position in front of the door. The picture upon said member will thus be presented to the mirror in parallel relation thereto so that the animal may not only see a reflection of the picture carried by said member, in the mirror, but may view the picture upon said member. When the trap is used for catching rats, for instance, the picture upon the member 45 may be of a dog or cat, for example, so that the animal will be frightened from the chamber 17 into the chamber 18, the partition 15 being provided, as best shown in Figure 2, with an opening 57 through which the animal may pass.

Figures 8, 11, 12:
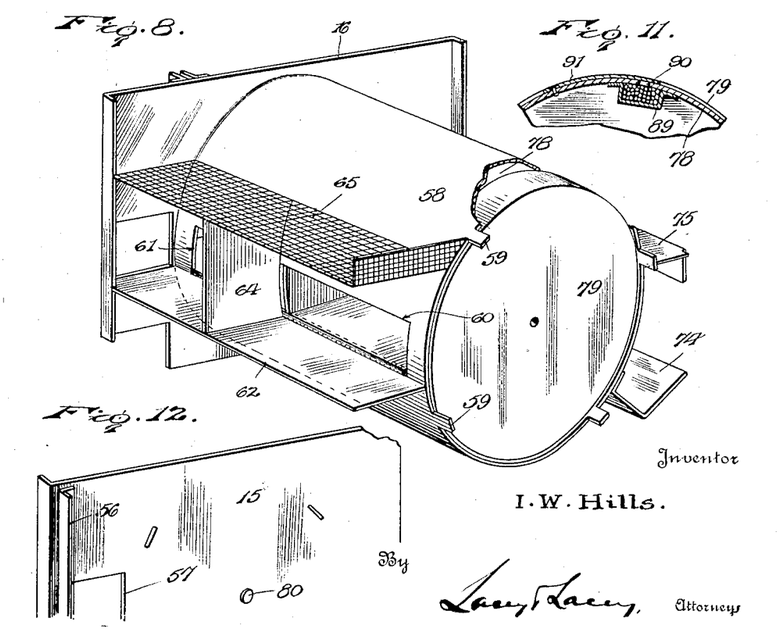
Figure 8 is a detail perspective view showing the trap drum and casing of the device.
Figure 11 is a detail sectional view showing one of the shot pockets of the trap drum.
Figure 12 is a fragmentary perspective view showing one of the partition walls employed to carry the casing for the trap drum.

Permanently fixed at one end to the partition 16 is a cylindrical casing 58 detachably connected at its opposite end to the partition 15 by tongues 59, the partition 15 being provided, as shown in detail in Figure 12, with slots to accommodate the tongues. The casing 58 thus rigidly connects the partitions so that the casing and said partitions may be slidably removed as a unit upwardly from the trap body. Formed in the casing at its rear side are alined entrance openings 60 and 61 and secured to the casing at the bottom edges of said openings is a floor plate 62 projecting through the openings to define, as particularly shown in Figure 9, a stop flange 63 projecting within the casing. Rising from the floor plate 62 between said openings is a partition 64 and secured to the top edge of said partition as well as to the casing is a ceiling screen 65 extending between the casing and the rear side wall of the trap body as well as between the partitions 15 and 16 to define, as best seen in Figure 2, a passageway 66 leading from the opening 57 to the entrance opening 60 of the casing as well as a second passageway 67 leading to the entrance opening 61 of the casing. At one end of the passageway 67, the partition 16 is provided with an opening 68 and formed in the rear side wall of the trap body is a similar opening 69 providing a rear entrance for the trap into said passageway. Formed in the casing 58 at its forward side is an exit opening 70, and formed on the casing at the lower edge of said opening is an inwardly directed stop flange 71. Above the exit opening, the casing is provided with a window opening 72 closed by a foraminous plate 73 soldered or otherwise attached to the casing. Secured to the casing beneath the exit opening is a trough-shaped floor plate 74, the free longitudinal edge of which rests against the flange 11 of the base 10 at the adjacent side thereof. This floor plate is of a length to extend between the partitions 15 and 16 and secured to the casing to extend between the partitions above the exit opening is a ceiling plate 75 abutting the forward side wall of the trap body. These plates thus cooperate to define a passage 76 leading from the exit opening 70 of the casing and formed in the partition 16 at the far end of said passage is an opening 77 connecting the passage with the cage chamber 19.

Figures 9, 13:
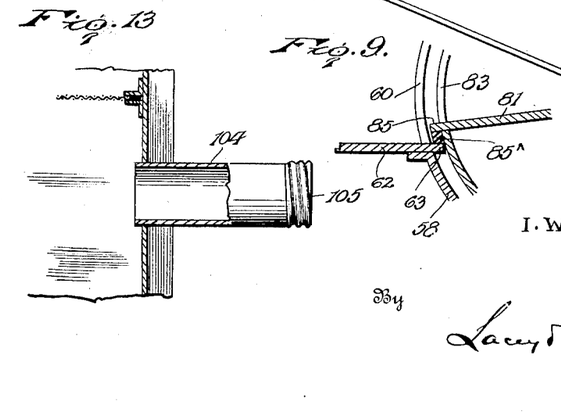
Figure 9 is an enlarged detail sectional view through the drum.
Figure 13 is a fragmentary sectional view showing the emptying tube for the cage of the trap.
Figure 10:
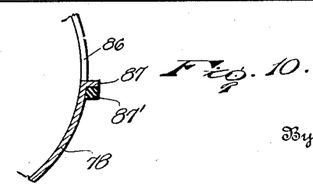
Figure 10 is an enlarged detail sectional view similar to Figure 9.

Mounted to oscillate within the casing 58 is a trap drum 78 closed at its ends by heads 79 frictionally fitting over the ends of the drum and adjustably mounted upon the partitions 15 and 16 are trunnions 80 engaging the heads axially of the drum rotatably supporting the drum. Extending transversely within the drum is a chordally disposed floor 81 from which rises a partition 82 alining with the partition 64 and at the adjacent end of the floor the wall of the drum is, as best shown in Figure 2, cut away to define entrance openings 83 and 84 at opposite sides of the partition. The openings 83 and 84 are disposed to register with the entrance openings 60 and 61 of the casing and, as shown in Figure 9, the floor 81 is formed to project through the openings 83 and 84 at the bottom edges thereof to define a stop flange 85 carrying a cushion 85' of rubber or the like to abut the stop flange 63 of the floor plate 62. Formed in the wall of the drum at its forward side above the floor is an exit opening 86 at the bottom edge of which the drum is, as shown in Figure 10, provided with a stop flange 87 carrying a cushion 87' of rubber or the like to abut the stop flange 71 of the casing when the opening 86 will register with the exit opening 70 of the casing. Mounted within the drum immediately beneath the rear margin of the floor 81 is a bar or counterweight 88 normally holding the drum in the position shown in Figure 7, limited by the flanges 63 and 85, and secured within the drum at opposite sides of the vertical center line thereof are shot pockets 89. As shown in detail in Figure 11, the drum is provided with openings 90 through which said pockets may be filled with shot and pivoted upon the drum are cover plates 91 normally closing said openings. Thus, as will be perceived, shot may be readily introduced into these pockets to provide counterweights auxiliary to the counterweight 88 for delicately balancing the drum. Rising inwardly from the drum between the floor 81 and the exit opening 86 are prongs or spurs 92 scattered along the wall of the drum from end to end thereof.

Figure 7:
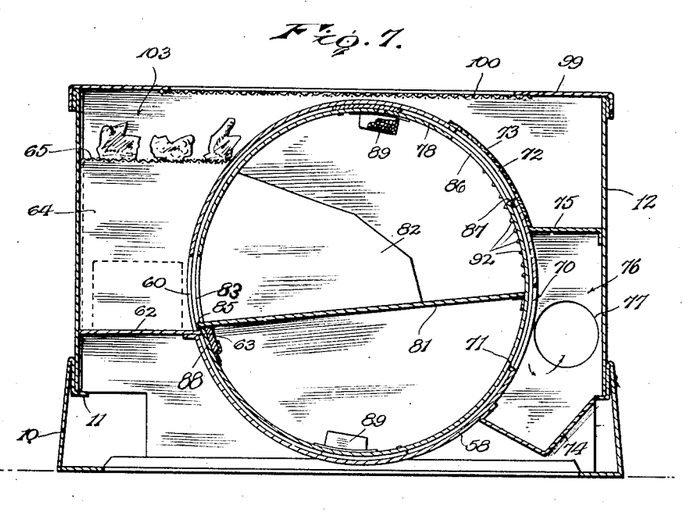
Figure 7 is a transverse sectional view on the line 7—7 of Figure 2, looking in the direction of the arrows.

As will now be understood in view of the foregoing, the trap drum will normally stand set, as shown in Figure 7, so that an animal entering the passage 66 from the entrance chamber 17 may pass into the drum through the registering openings 60 and 83 while an animal entering the passage 67 through the opening 69 may pass into the drum through the registering openings 61 and 84. Upon entering the drum, the animal will be attracted to the window opening 86 in the drum since this window opening provides a point where light may enter the drum. Accordingly, the animal will cross the pivotal center of the drum, when the weight of the animal will cause the drum to rotate in a clockwise direction until the stop flange 87 of the drum strikes the stop flange 71 of the casing. As previously noted, the exit opening 86 in the drum will then register with the exit opening 70 of the casing and since, when the drum is thus rotated, the animal will be caused to walk upon the portion of the wall of the drum having the spurs 92 thereon, the animal will, by the hazardous footing thus provided, be caused to leave the drum through said registering openings and enter the passage 76. As soon as the animal thus leaves the drum, the counterweights of the drum will return said drum to its normal position so that the drum will be rotated to close the opening 70 of the casing cutting off retreat of the animal and since the floor plate 74 of the passageway is trough-shaped and will, therefore, provide an uncomfortable footing, the animal will seek the outlet 77 of the passage to enter into the cage chamber 19. In connection with the trap drum, particular attention is directed to the fact that the floor 81 of said drum is arranged below the pivotal center thereof. Thus, increased space is not only provided above the floor but also, due to such mounting of the floor, the drum will, under the weight of an animal upon the floor, be caused to quickly trip or rotate to cut off retreat of the animal while the movement of the drum to effect such cut off is correspondingly decreased. Accordingly, after rotation of the drum has once been started, such movement will continue to completion before the animal can have time or opportunity to counteract said movement and the probability of a catch accordingly made practically certain.

Secured to the partition 16 within the chamber 19 of the trap body are spaced vertical flanges 93 and mounted upon the adjacent end wall of the trap body are similar flanges 94. Slidably fitting between these pairs of flanges is a preferably reticulate partition 95 dividing the chamber 19 into a cage 96 and passageway 97, the cage occupying the major portion of the chamber. The forward side wall of the trap body is preferably provided with a window 98 for the cage and removably fitting over the trap body is a cover 99 closing the chambers of the trap body, the cover being preferably provided with a reticulate portion 100. Formed in the base 10 of the trap body at its adjacent end is an entrance opening 101 and formed in the floor plate 14 at the adjacent end of the passageway 97 is an entrance opening 102. Thus, an animal may readily enter at the opening 101 to pass beneath the floor plate into the passageway 97 at the opening 102, when the animal may then find its way through the opening 68 in the partition 16 to travel through the passage 67 and enter the trap drum. As best shown in Figure 7, a bait chamber 103 is defined between the cover 99 and the ceiling screen 65 of the passageways 66 and 67, said chamber being closed at its ends by the partitions 15 and 16 and lying between the casing 58 of the trap drum and the rear side wall of the trap body. By removing the cover, any suitable bait may be disposed within said chamber for baiting the trap. Leading from the cage 96 is, as best shown in Figure 13, an emptying tube 104 fixed to the adjacent end wall of the trap body to extend through said wall and threaded upon the outer end of the tube is a closure cap 105. Thus, by removing said cap, the cage may be readily emptied.

Having thus described the invention, what is claimed as new is:

1. An animal trap including a trap body having an entrance chamber and a cage accessible from said chamber, said chamber being provided with a vestibule and having an entrance opening to the vestibule, a normally open animal closed door cutting off retreat from said chamber into the vestibule, and automatic trapping means interposed between said chamber and the cage.

2. An animal trap including a trap body having an entrance chamber and a cage accessible from said chamber, the chamber being provided with an entrance opening, a mirror in the chamber visible through said opening, a normally open animal closed door for cutting off retreat from said chamber, and automatic trapping means interposed between said chamber and the cage.

3. An animal trap including a trap body having an entrance chamber and a cage accessible from said chamber, a picture carrying member movable by an animal in said chamber to position for displaying a picture tending to frighten the animal from said chamber to enter the cage, and automatic trapping means interposed between said chamber and the cage.

4. An animal trap including a trap body having an entrance chamber and a cage accessible from said chamber, a picture carrying member shiftable by an animal in said chamber to a position for displaying a picture in the path of retreat of the animal tending to frighten the animal from said chamber to enter the cage, and automatic trapping means interposed between said chamber and the cage.

5. An animal trap including a trap body having an entrance chamber and a cage accessible from said chamber, the chamber having an entrance door opening associated therewith, a picture carrying member shiftable by an animal in said chamber to a position across said opening for displaying a picture tending to frighten the animal from said chamber to enter the cage, and automatic trapping means interposed between said chamber and the cage.

6. An animal trap including a trap body having an entrance chamber and a cage accessible from said chamber, a mirror in the chamber, a picture carrying member shiftable by an animal in said chamber to a position for displaying a frightening picture to be reflected in the mirror for frightening the animal from said chamber to enter the cage, and automatic trapping means interposed between said chamber and the cage.

7. An animal trap including a trap body having an entrance chamber and a cage accessible from said chamber, the chamber having an entrance opening associated therewith, a mirror in the chamber normally visible through said opening, a picture carrying member shiftable by an animal in said chamber to a position for displaying a frightening picture to be reflected in the mirror as well as visible by the animal for frightening the animal from the chamber to enter the cage, and automatic trapping means interposed between said chamber and the cage.

8. An animal trap including a trap body having an entrance chamber and a cage accessible from said chamber, the chamber having an entrance opening associated therewith, a mirror in the chamber normally visible through said opening, an animal closed door for cutting off retreat from said chamber, a picture carrying member operatively connected with the door and shiftable when the door is closed to position for displaying a frightening picture to be reflected in the mirror as well as visible by the animal for frightening the animal from said chamber to enter the cage, and automatic trapping means interposed between said chamber and the cage.

9. In an animal trap, a trap body having an entrance opening, a door associated with said opening and normally gravitating to open position, a pivoted lever operatively connected with the door, a platform carried by said lever and depressible under the weight of an animal for rocking said lever and closing the door, a pivoted picture carrying member, and an operative connection between said member and the lever whereby said member will be shifted to position for displaying a picture thereon when the door is closed.

10. In an animal trap, a trap body having an entrance chamber, a plate in the chamber forming a vestibule therefor, the trap body being provided with an entrance opening leading to the vestibule and said plate being provided with a door opening and having a flange adjacent said opening, guide rods slidable through said flange, a door carried by said rods normally gravitating to open position, and a platform within the chamber operatively connected with the door and depressible under the weight of an animal for shifting the door to close the door opening.

11. In an animal trap, a trap body having an entrance chamber, a plate in said chamber providing a vestibule therefor, the trap body being provided with an entrance opening for the vestibule and the plate being provided with a door opening from the vestibule into said chamber, a door associated with said door opening and normally gravitating to open position, guide rods slidably supporting the door, a cross strip coupling said rods, a lever frame pivoted within the chamber and having a cross bar, links pivotally connected with the trap body to extend over said bar, rods connecting said links with said cross strip, and a platform upon said lever frame depressible under the weight of an animal for rocking the frame and elevating said cross bar beneath said links for raising the door to close said door opening.

12. In an animal trap, a trap body having an entrance chamber, a plate in said chamber providing a vestibule therefor, the trap body being provided with an entrance opening for the vestibule and the plate being provided with a door opening from the vestibule into said chamber, a door associated with said door opening and normally gravitating to open position, guide rods slidably supporting the door, a cross strip coupling said rods, a lever frame pivoted within the chamber and having a cross bar, links pivotally connected with the trap body to extend over said bar, rods connecting said links with said cross strip, a platform upon said lever frame depressible under the weight of an animal for rocking the frame and elevating said cross bar beneath said links for raising the door to close said door opening, a picture carrying member pivoted upon said plate, and an operative connection between said member and the cross bar whereby the member will be shifted to a position for displaying a picture thereon when the door is closed.

13. In an animal trap, a trap body having a cage, a trap drum casing having an entrance opening and an exit opening in communication with the cage, stop means upon the casing adjacent said entrance opening, stop means upon the casing adjacent said exit opening, a counter-weighted trap drum mounted to oscillate in the casing normally closing said exit opening and provided with an entrance opening registering with the entrance opening of the casing, a floor in said drum projecting through the entrance opening of the drum to engage said first mentioned stop means for limiting the drum in its rotative movement in one direction, the drum being provided with an exit opening and being rotatable to dispose such opening in registration with the exit opening of the casing, and stop means upon the drum adjacent the exit opening thereof to engage said second mentioned stop means for limiting the drum in its rotative movement in the opposite direction.

14. In an animal trap, a trap body having a cage, a trap drum casing having an entrance opening and an exit opening in communication with the cage, stop means upon the casing adjacent said entrance opening, stop means upon the casing adjacent said exit opening, a counter-weighted trap drum mounted to oscillate in the casing normally closing said exit opening and provided with an entrance opening registering with the entrance opening of the casing, a floor in said drum projecting through the entrance opening of the drum to engage said first mentioned stop means for limiting the drum in its rotative movement in one direction, the drum being provided with an exit opening and being rotatable to dispose such opening in registration with the exit opening of the casing, stop means upon the drum adjacent the exit opening thereof to engage said second mentioned stop means for limiting the drum in its rotative movement in the opposite direction, and spurs upstanding within the drum adjacent the exit opening thereof.

15. An animal trap including a trap body having an entrance chamber, a cage and an intervening trap drum chamber, and a counter-weighted trap drum in the trap drum chamber controlling communication between the entrance chamber and the cage, the trap body being provided with a front entrance opening for the entrance chamber, a rear entrance opening for the trap drum chamber and bottom openings one in communication with the entrance chamber and the other in communication with the trap drum chamber.

16. An animal trap including a trap body having an entrance chamber and a cage accessible from said chamber, a trap drum casing interposed between said chamber and the cage and having an entrance opening, a hollow trap drum mounted to oscillate in said chamber and having a partition therein forming a floor located below the rotation axis of the drum, and means limiting the drum to normally stand in a position having said floor inclining upwardly away from the level of said opening.

17. An animal trap including a trap body having an entrance chamber and a cage accessible from said chamber, pictorial means associated with the entrance chamber for frightening an animal from said chamber to enter the cage, and automatic trapping means interposed between said chamber and the cage.

18. An animal trap including a trap body having an entrance chamber and a cage accessible from said chamber, a hollow oscillatory trap drum interposed between said chamber and the cage, and a partition within the drum forming a floor located below the rotation axis of the drum.

In testimony whereof I affix my signature.

IRAD W. HILLS. [L. S.]